Feb. 9, 1960
P. W. McLEOD
2,924,189
SOD MULCHER FOR GRAIN DRILLS
Filed Sept. 2, 1955
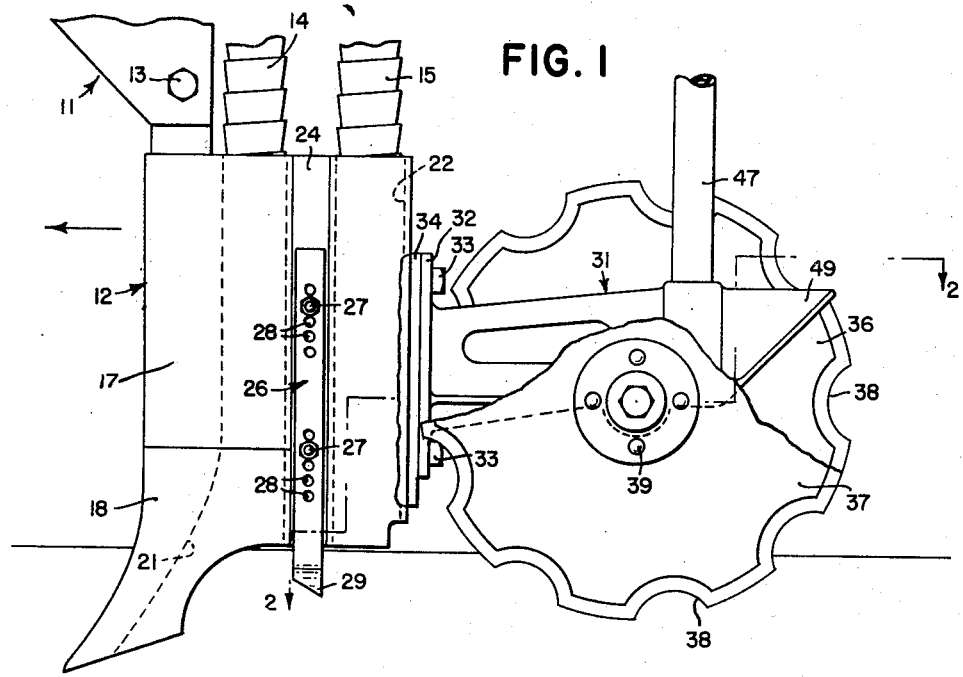
FIG. 1
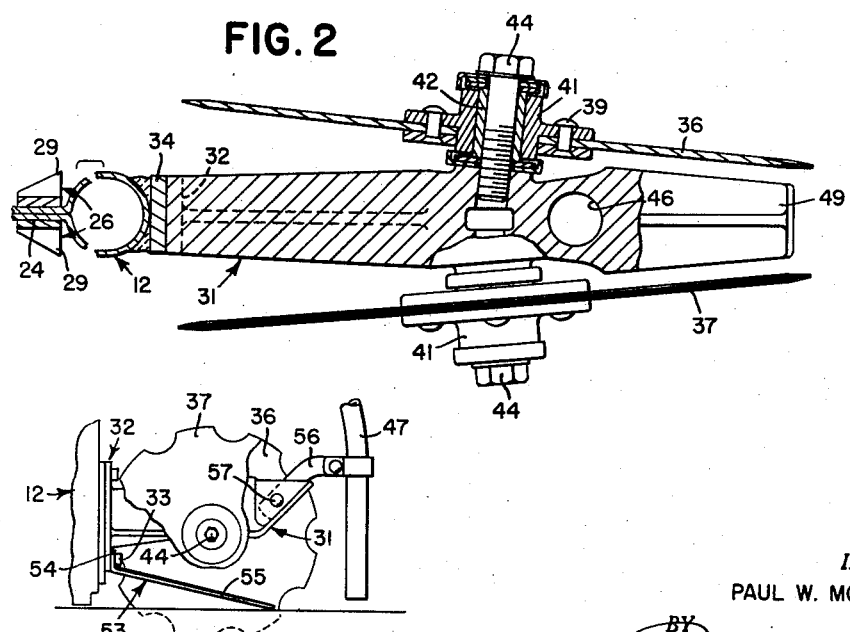
FIG. 2
FIG. 3
INVENTOR.
PAUL W. MCLEOD
ATTORNEYS

United States Patent Office 2,924,189
Patented Feb. 9, 1960

2,924,189

SOD MULCHER FOR GRAIN DRILLS

Paul W. McLeod, Beaver Dam, Wis., assignor, by mesne assignments, to Deere & Company, a corporation of Delaware Application September 2, 1955, Serial No. 532,211

3 Claims. (Cl. 111—80)

The present invention relates generally to agricultural machines and more particularly to implements for the planting and depositing of seed and fertilizer in the ground.

The object and general nature of this invention is the provision of an agricultural implement especially constructed and arranged to reseed and renovate pasture land and other areas of established sod. More specifically, it is an object of this invention to provide means for opening a relatively narrow furrow in established sod, or in other areas where considerable plant growth is present, with means to supply fertilizer to the furrow opened, cover the fertilizer with a quantity of soil, and then apply seed and cover the latter by a mulch of soil taken from the surface of the ground immediately adjacent the edges of the furrow. More specifically, it is an object of this invention to provide means of the type just described, in which the furrow is closed by making a mulch from soil that includes the permanent crop in which the reseeding is being done and depositing the mulched material onto the seed. One advantage of forming a mulch from the sod at the immediate sides of the furrow is to reduce the competition of the permanent crop in which reseeding is done with the new growth so that the latter is not choked out before it gets a good start.

A further feature of this invention is the provision of a mulcher to form a suitable seed bed in which to deposit small grass and legume seeds which must be planted near the surface of the ground.

These and other objects and advantages of the present invention will be apparent to those skilled in the art after a consideration of the following detailed description of preferred structure in which the principles of the present invention have been incorporated, taken in conjunction with the accompanying drawings, in which:

Fig. 1 is a side view of a portion of a grain drill in which the principles of the present invention have been embodied.

Fig. 2 is a sectional view taken generally along the line 2—2 of Fig. 1, with a part broken away.

Fig. 3 is a fragmentary perspective view illustrating a modified form of the present invention.

The present invention is shown as incorporated in a sod mulcher for a grain drill of more or less conventional construction. Since the present invention is not particularly concerned with the individual details of the grain drill itself, the same has not been completely illustrated in the accompanying drawings, the grain drill being represented by a bracket or support 11 to which an applicator 12 in the form of a furrow opener shoe means is connected, as by some form of overload trip means including a pivot member 13. The grain drill also includes fertilizer selecting mechanism, represented by a fertilizer tube 14, and seed selecting mechanism, represented by seed tube 15.

The applicator or furrow opener shoe means 12 forms a part of the present invention and is in the form of a relatively narrow member having an upper section 17 and a ground penetrating toe section 18, the upper section 17 and the toe section 18 being hollowed out to form a vertical passageway 21 for fertilizer and, rearwardly thereof, a second passageway 22 for seed. Between the two passageway sections 21 and 22, the shoe means 12 is narrowed, as at 24, to form a flat surface at each side of the shoe means 12, whereby soil engaging means in the form of a pair of vertical knives 26 are adjustably received and fixed in different positions of adjustment, as by clamping bolt means 27, each knife 26 having a plurality of openings 28 to receive the bolt means 27. At its lower end, each of the knives 26 is provided with an outwardly bent earth-engaging end 29 lying on a level generally adjacent the surface of the ground and above the forward portion of the applicator toe section 18.

Secured to the rear edge of the shoe means 12 is a generally horizontally disposed rearwardly extending bracket 31 having a flat vertical extending flange 32 at its forward end adapted to be fixed, as by a pair of stud bolts 33, to an attaching section 34 formed on or carried by a rear part of the furrow opener 12. The bracket 31 forms a support for the two disks 36 and 37 that form the principal parts of the improvements constituting the present invention. Each of the disks 36 and 37 is a flat plane member, preferably having notches 38 formed in the peripheral portion thereof, and each disk is fixed, as by rivets 39, to a hub member 41 that is rotatably mounted, as a bearing means 42, on a stud bolt 44 that forms an axle receiving the associated rotatable disk member. The disks 36 and 37 are individually and freely rotatable on the associated axle members 44. The latter parts are also disposed at an angle to one another, as best shown in Fig. 2, so as to arrange the disks 36 and 37 in a forwardly diverging relation, the lateral spacing between the forward edges of the two disks 36 and 37 being two or three times as great as the lateral dimension of the shoe means or furrow opener 12. The lateral spacing between the rearmost edges of the disks 36 and 37 is, as will be clear from Fig. 2, only slightly greater than the lateral dimension of the furrow opener 12.

The rear section of the bracket 31 is formed with a fertilizer receiving opening 46, and a tube 47 (Fig. 1) extends upwardly and is adapted to deposit near the top of the furrow small grass seeds that should not be covered very deeply. Such seeds may be supplied from any suitable source, such as a box or hopper carried by or forming a part of the grain drill. Rearwardly of the seed passage 46, the bracket 31 is provided with a scraper section 49 that extends generally rearwardly between the disks 36 and 37 and, as shown in Fig. 2, extends close to the inner faces of the disks at their rear portions for the purpose of removing excess adhering soil and the like from the disks.

The operation of a device of the present invention is as follows.

Where it is desired, for example, to reseed and fertilize pastures and grassland, or other areas where there is an existing sod structure or planted growth, or where the usual seed bed preparation is impossible or impractical, a grain drill or a planter is equipped with a plurality of shoe means 12 and associated structure and the implement operated with the toe sections 18 extending down into the surface of the ground, being drawn along in the direction of the arrow shown in Fig. 1. Each shoe means 12 forms a relatively narrow furrow in the existing sod structure, and as the implement is advanced, the knives 26, there being one at each side of the shoe means 12, scrape along the sides of the furrow formed by the shoe means 12 and deposit quantities of soil on the top of the fertilizer that is discharged through the tube 14 into the bottom or lower portion of the furrow opened by the toe means 18. By covering this fertilizer with a quantity of soil, seed that is discharged into the furrow through the seed tube 15 and seed passage 22 does not come into direct contact with the fertilizer discharged into the furrow through the fertilizer tube 14 and fertilizer passage 21.

Generally, in the normal use of the present invention, the seed discharged through the seed tube 15 are cereal crops or large grass seeds that can be covered quite deeply. Such cereal crops as oats, rye, wheat, etc., supply supplemental winter grazing at the time that grasses are dormant. Fertilizer supplied through the tube 14 feeds the cereal crop and the grasses which will follow the next spring.

For the purpose of closing the furrow opened by the toe section 18 of the furrow opener 12 and to make a mulch for the small seed that is deposited on top of the soil that covers the fertilizer discharged into the bottom of the furrow, the two disks 36 and 37 are mounted to operate on the marginal portions of the furrow and to cut away portions of the sod immediately adjacent the furrow, mulching the soil and placing the same on top of the seed discharged through the tube 15. In this way a threefold purpose is accomplished by the disks 36 and 37. First, they close the furrow by bringing soil in and placing it on top of the seed; second, by destroying the existing plant growth immediately adjacent the edges of the furrow opened by the toe section 18, competition of the permanent crop, in which the reseeding is being done, with the new growth is reduced and the new grass is given an opportunity to germinate and grow before the growth of the permanent crop closes in and crowds out the new grass or other crops; and third, a seed bed is formed into which small seed that should not be planted very deep can be deposited, as through the tube 47 and opening 46.

Figure 3 shows a construction that is adapted to be employed where more aggressive scraper action is desired than that provided by the scraper section 49 described above. In this form of the invention a separate scraper blade 53 has a forward upwardly bent section 54 apertured to provide for mounting the blade 53 under the head of the lower bolt 33, the main scraping section 55 of the blade extending downwardly and rearwardly between the disks 36 and 37. When the blade 53 is employed it is desirable to have the seed tube 47 carried in an auxiliary bracket 56 fixed, as by a bolt 57, to the rear portion of the bracket 31. The scraper 53 serves to prevent clogging of the mulchers when operating in heavy sod or when running over a ridge or the like.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. In a grain drill having fertilizer and seed selecting means, the improvement comprising furrow opening shoe means adapted to open a relatively deep furrow and adapted to be connected with said fertilizer and seed selecting means to receive fertilizer and seed therefrom, said shoe means including an integral structure having a forward first generally vertical passageway and spaced rearwardly thereof a second generally vertical rear passageway terminating at its lower end at a point above the lower end of said first vertical passageway, means forming a vertical generally flat surface at each side of said shoe means between said first and second passageways, generally vertically disposed and vertically adjustable soil engaging means shiftable generally vertically along said generally flat surfaces, means fixing said soil engaging means in different positions of adjustment to said flat surfaces, said soil engaging means having at the lower ends thereof generally laterally outwardly extending earth-engaging points adapted to engage the sides of said furrow above the lower end of said first passageway and below the lower end of said second passageway, said soil engaging means being thereby adapted to engage both sides of said relatively deep furrow below the top thereof and above the bottom thereof and above any fertilizer therein to remove soil from the sides only of the furrow and cover the fertilizer in the bottom thereof.

2. In a grain drill having fertilizer and seed selecting means, the improvement comprising furrow opening shoe means adapted to open a relatively deep furrow and adapted to be connected with said fertilizer and seed selecting means to receive fertilizer and seed therefrom, said shoe means including an integral structure having a forward first generally vertical passageway and spaced rearwardly thereof a second generally vertical rear passageway terminating at its lower end at a point above the lower end of said first vertical passageway, soil-engaging means carried by said shoe means, means connecting said soil engaging means to said shoe means in a position to engage both sides of said relatively deep furrow below the top thereof and above the bottom thereof and above any fertilizer therein to remove soil from the sides only of the furrow and cover the fertilizer in the bottom thereof, a generally horizontal bracket fixed at its forward end to the rear side of said shoe means and extending rearwardly thereof, a pair of mulching disks rotatably carried by said bracket forward of the rear end thereof, and means on the rear end of said fore-and-aft extending bracket to remove adhering soil from the laterally inner sides of said mulching disks.

3. The invention set forth in claim 2, further characterized by a separate scraper blade disposed below said bracket in a generally horizontal position, means fixing the forward end of said scraper blade to said shoe means so that the rear end of the scraper blade is disposed at about ground level and between said mulching disks below said fore-and-aft extending bracket, said scraper blade being disposed adjacent both front and rear portions of said disks, an auxiliary bracket fixed to the rear portion of said horizontal bracket and extending rearwardly beyond said disks, and a seed tube fixed to the rear portion of said auxiliary bracket rearwardly of said disks.

References Cited in the file of this patent

UNITED STATES PATENTS

| | | |
|---|---|---|
| 33,103 | Pond | Aug. 20, 1861 |
| 201,204 | Shine | Mar. 12, 1878 |
| 553,510 | Campbell | Jan. 28, 1896 |
| 648,616 | Hedrick | May 1, 1900 |
| 800,555 | Dennis | Sept. 26, 1905 |
| 969,338 | Carter | Sept. 6, 1910 |
| 1,084,307 | Altgelt | Jan. 13, 1914 |
| 1,113,773 | Garrity | Oct. 13, 1914 |
| 1,124,006 | Gallespie | Jan. 5, 1915 |
| 1,184,508 | Beeman et al. | May 23, 1916 |
| 1,410,883 | Bozard | May 28, 1922 |
| 1,473,297 | Knight | Nov. 6, 1923 |
| 1,518,177 | Carpenter | Dec. 9, 1924 |
| 1,908,255 | Kaupke | May 9, 1933 |
| 2,159,652 | Brunner | May 23, 1939 |
| 2,713,836 | Ajero | July 26, 1955 |
| 2,769,412 | Holle | Nov. 6, 1956 |
| 2,790,369 | Yetter | Apr. 30, 1957 |